United States Patent [19]
Spicer

[11] 4,095,216
[45] June 13, 1978

[54] METHOD AND APPARATUS FOR DISPLAYING ALPHANUMERIC DATA

[75] Inventor: Denis Frank Spicer, Bedford, England

[73] Assignee: Texas Instruments Incorporated, Dallas, Tex.

[21] Appl. No.: 708,524

[22] Filed: Jul. 26, 1976

[30] Foreign Application Priority Data

Aug. 7, 1975 United Kingdom ............... 33014/75

[51] Int. Cl.[2] .............................................. G06K 15/20
[52] U.S. Cl. .............................................. 340/324 AD
[58] Field of Search .................. 340/324 AD; 178/30; 354/6, 7

[56] References Cited

U.S. PATENT DOCUMENTS

| | | | |
|---|---|---|---|
| 3,573,789 | 4/1971 | Sharp et al. | 340/324 AD |
| 3,680,076 | 7/1972 | Duffek et al. | 340/324 AD |
| 3,812,491 | 5/1974 | Barraclough et al. | 340/324 AD |
| 3,878,536 | 4/1975 | Gilliam | 178/30 |
| 3,969,716 | 7/1976 | Roberts | 340/324 AD |

*Primary Examiner*—David L. Trafton
*Attorney, Agent, or Firm*—Rene' Grossman; Richard L. Donaldson; James T. Comfort

[57] ABSTRACT

A line interlaced video signal having odd and even alternating fields produces an alphanumeric character display in the form of a dot matrix character, each matrix location comprising segments of two next adjacent lines in the display. To improve the resolution of the characters, diagonals are detected and partly filled to provide a rounded effect. Two parallel-in serial-out shift registers are used, one of the shift registers having an associated input buffer store. A binary word representing dot information for one row of a character is read out from a dot matrix character generator ROM and loaded into one of the shift registers. On even (odd) fields the ROM output for the previous (succeeding) row is read and loaded into the other shift register. The last two bits of the two shift registers are compared to detect diagonals in the character information and used to modify the video signal to lengthen the leading or trailing edge of the corresponding dot to produce the rounded character.

10 Claims, 9 Drawing Figures

METHOD AND APPARATUS FOR DISPLAYING ALPHANUMERIC DATA

This invention relates to the displaying of alphanumeric data, and is of particular, but not exclusive, value in the production of an alphanumeric display on a cathode ray tube screen in response to digital signals representing characters to be displayed.

It has been proposed to broadcast digitally encoded data representing pages of lines of alphanumeric characters for reproduction on the screens of domestic television receivers. In the proposed systems the digital data representing a line of characters is inserted into the broadcast television signal in an otherwise blank line period preceding the conventional picture information. Over several fields of the television signal a succession of lines of characters is transmitted until finally digital data representing a page of information is stored at the receiver. The conventional television video signal can be suppressed at the wish of the viewer and an alphanumeric display derived from the stored page of information substituted for it. In order to generate the display from the digital data it is necessary to decode the data and use the decoded output to generate from a read-only memory, for example, video signals which would result in the required display as the electron beam of the tube is scanned over its raster.

It is an object of this invention to provide an improved display of alphanumeric characters in response to digitally encoded data.

According to one aspect of the present invention there is provided an apparatus for generating video signals suitable to produce an alphanumeric display on a cathode ray display tube when the beam of the tube is deflected in an interlaced raster having first and second field scans, the apparatus including (a) digital storage means having a plurality of storage locations respectively allocated to different alphanumeric characters to be displayed, there being at each storage location a plurality of groups of storage elements storing data representing the particular character allocated to the location in a rectangular dot matrix form, each group of storage elements storing the dot pattern for a particular row of the matrix, (b) first address means for selecting a storage location of the digital storage means in accordance with a character to be displayed, (c) second address means for selecting at a series of instants in a particular order the groups of storage elements at the location selected by the first address means and producing corresponding first output signals, and also for selecting between the instants of the series the groups of storage elements in the same order to produce second output signals, the selection of groups between instants being such that a group selected between instants is associated with a group selected at an instant and is the group immediately preceding or immediately following the associated group, depending on whether the data selected is to be used in the first or the second field scan, (d) first and second registers connected to receive the first and second output signals respectively and store the corresponding data, (e) means for sequentially selecting the data in both registers synchronously, (f) logic means responsive to a pair of adjacent data elements in each of the first and second registers to produce an indication if a diagonal is detected, and (g) means for modifying the data selected sequentially from the first register by the addition to it of dot elongation signals whenever an indication is produced by the logic means, the modified data forming the video signal.

According to a second aspect of the present invention there is provided a method of rounding a character display generated by a rectangular dot matrix in which dot patterns are repeated in pairs of adjacent rows of the matrix, wherein whenever a diagonal occurs in a character the dots are elongated by an amount less than the width of a dot at either the leading or the trailing edges but not both so as to increase the overlap between dots in adjacent rows to at least the width of a dot.

In order that the invention may be fully understood and readily carried into effect an embodiment will now be described with reference to the accompanying drawings of which:-

Figure 1:
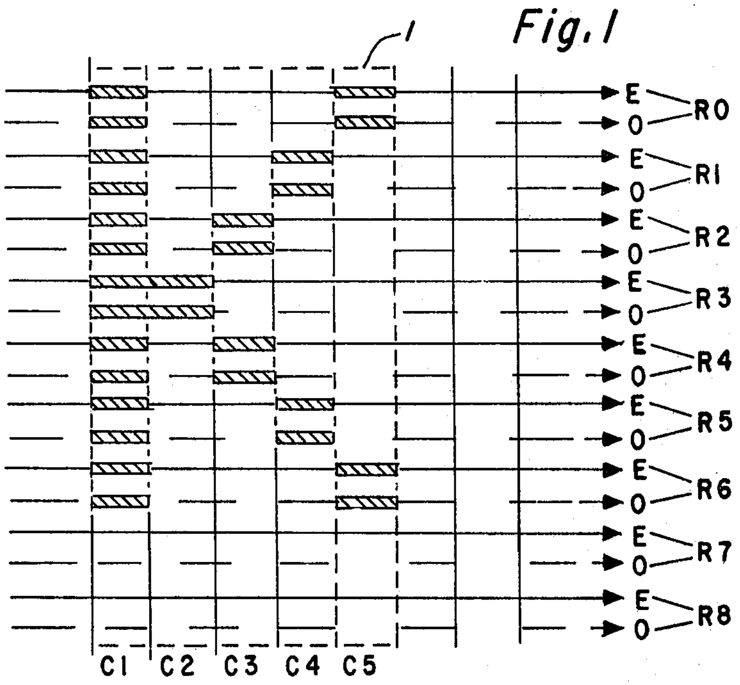
FIG. 1 is a schematic diagram of a letter 'K' as it might be generated on a cathode ray tube screen by a signal without half dot marking.
Figure 2:
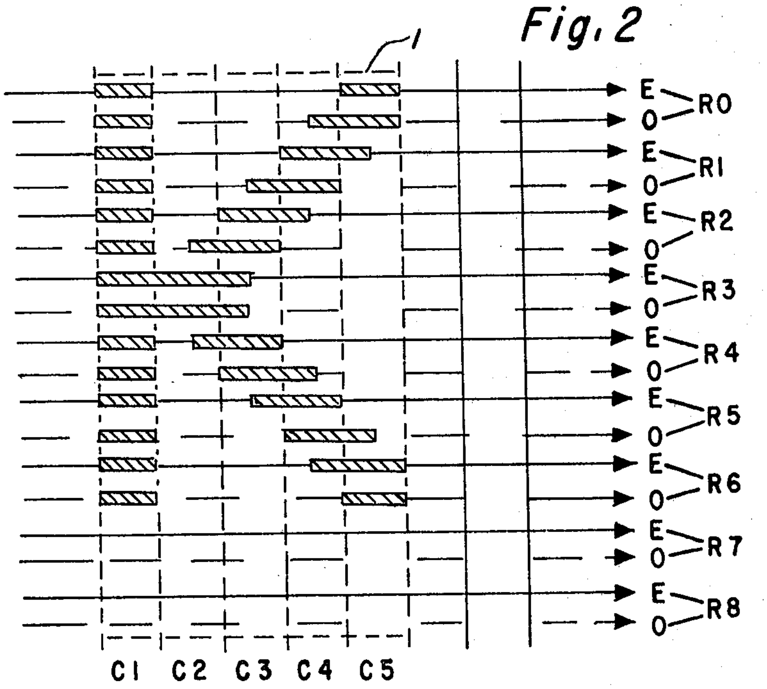
FIG. 2 is a schematic diagram of a letter 'K' generated on a cathode ray tube screen by a signal containing half column width marking.

Referring first to FIGS. 1 and 2, both Figures show part of a television screen having a display of an alphanumeric character, a letter K, generated from a dot matrix character generator read only memory (ROM), for example. In both cases the matrix for a single character has nine rows and five columns, each column having a width of one dot and each row being composed of two scan lines occupying consecutive fields of an interlaced raster scan. The boundaries of the matrix for a single character are shown by a close dotted line 1, the even field lines are designated E and the odd field lines (broken lines) are designated 0. In FIGS. 1 and 2 the rows of the matrix are numbered R0, R1, R2, . . ., R8 and the columns C1, C2, . . ., C5. The single character matrix shown has a space to the right of width two columns and a space below of depth one row. The thick block lines in the matrix show where the beam intensity is modulated to generate the character display on the screen. The modulation may take the form of decreasing the beam intensity thus generating a dark character on a bright background as shown in FIGS. 1 and 2 or of increasing the beam intensity thus generating a bright character on a dark background.

Figure 3A:
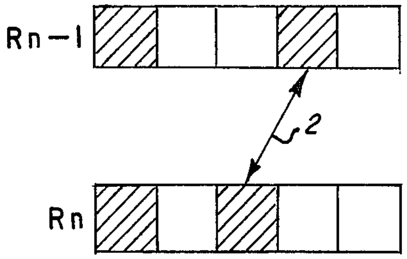
FIGS. 3A and 3B illustrate the test used herein to detect the presence of a "diagonal" in adjacent rows of a five bit matrix generated without half dot timing information.
Figure 3B:
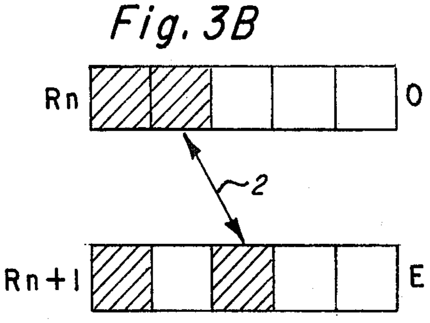
Figure 3C:
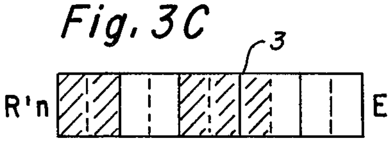
FIGS. 3C and 3D show respectively the second rows of FIGS. 3A and 3B with half column width marking added to take into account the diagonals shown in FIGS. 3A and 3B.
Figure 3D:
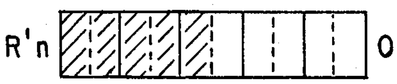

In FIG. 1 the even field and odd field lines are identically modulated. In FIG. 2 the even and odd field lines are not necessarily identically modulated, modifications being made when a diagonal line is detected in a character to be displayed. An electronic system which can be used to achieve this modulation will be described later; first the effect and precise nature of the modulation and its modification in FIG. 2 will be described. In FIG. 1 each modulation of a line occupies an integral number of columns of the matrix; in FIG. 2 this is not necessarily true. In FIG. 2 the pattern of modulation of an even field in a row Rn and the odd field of row Rn-1 of FIG. 1. If the modulation of these two rows of FIG. 1 is such as is shown in FIG. 3A or 3B there is a "diagonal" line present in the character (as indicated by arrowed lines 2). In the case of a diagonal line such as that in FIG. 3A the form of modulation of the even field in row Rn is modified in that an extra half column width of modulation is inserted at 3 to form the row R'*n* shown in FIG. 3C. This effects a smoothing between the parts of a character in one row and the next. For an odd field line R'*n* the pattern of modulation is derived from the odd field line R*n* and the even field line $Rn+1$. For an even field line R'*n* the pattern of modulation is derived from the even field line R*n* and the odd field $Rn-1$. FIGS. 3C and 3D show the half column width extensions to the modulations for even and odd field lines respectively due to the presence of diagonal lines in the character.

Figure 4:
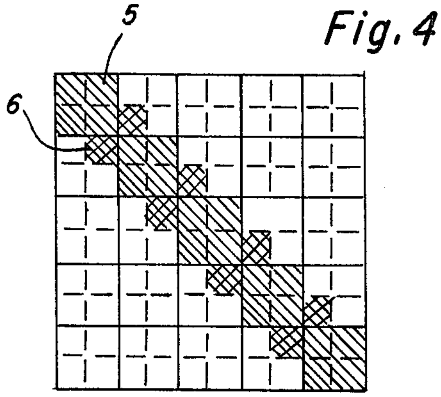
FIG. 4 shows a diagonal line represented by a matrix with half column width marking.

In FIG. 1 the lines R1 and R2 are as shown in FIG. 3A and the lines R3 and R4 are as shown in FIG. 3B. Thus in FIG. 2 the even field line R2 is as shown in FIG. 3C and the odd field line R3 is as shown in FIG. 3D. The other lines in FIG. 2 are generated in the same way. By this means the dot matrix of FIG. 2 includes half column width marking information. By this effect the reproduction of the characters is improved to make full use of the interlaced lines of the raster as illustrated schematically in FIG. 4. FIG. 4 shows a diagonal line as it would be rendered using the same modulation for both odd and even field lines; this being indicated by the leftward hatching; together with the modification which would be brought about by the use of half column with marking as described above; the modification is indicated by rightward hatching.

Figure 5:
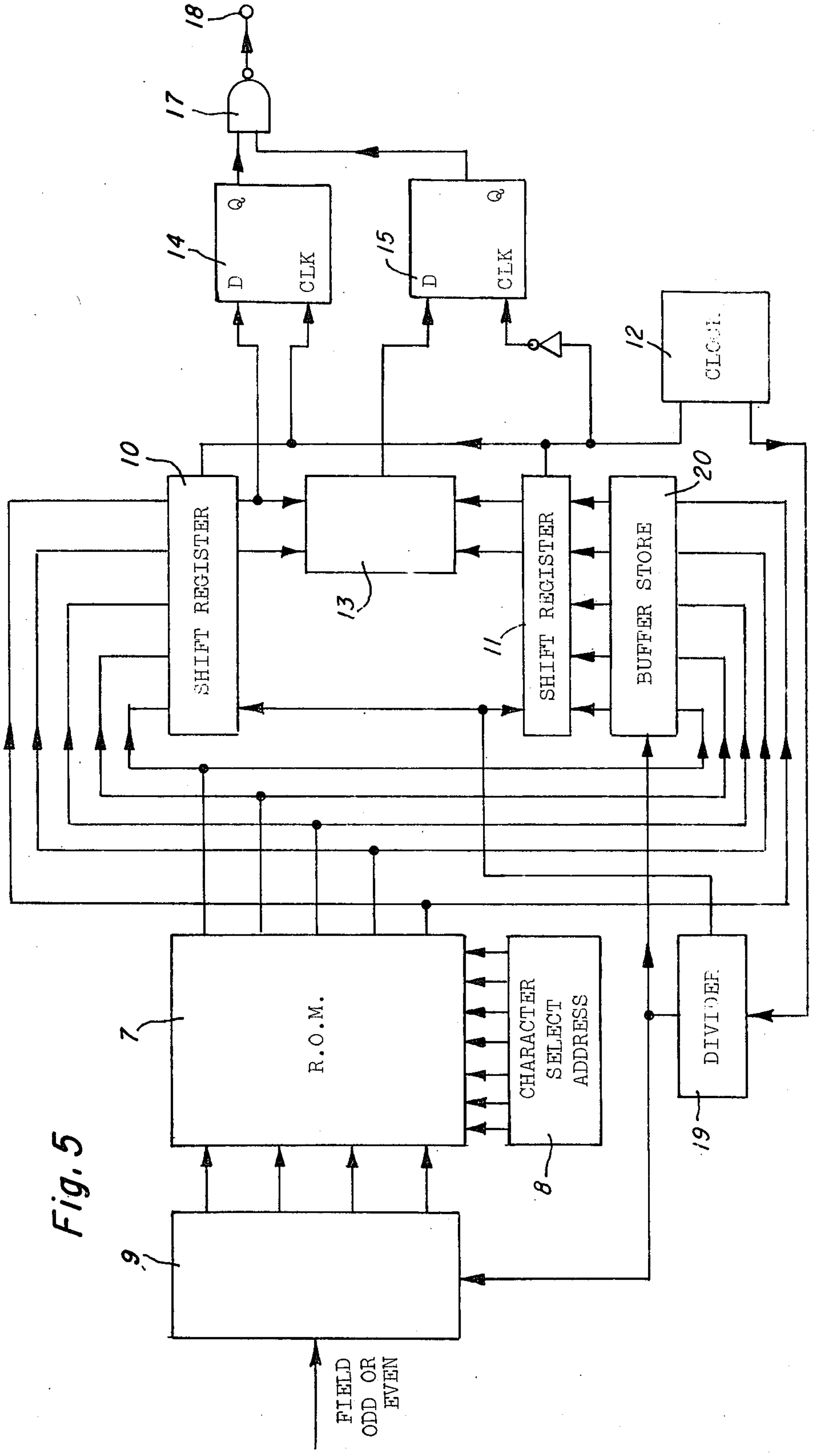
FIG. 5 is a block diagram of a circuit arrangement for producing a video signal with half column width marking.

FIG. 5 shows in block diagrammatic form a circuit arrangement by which half column width marking as described above can be generated. A read only memory (ROM) 7 is arranged to produce a binary output word which is the marking information for a line or row of a selected character. For the 5×9 dot matrix shown in FIGS. 1 and 2 the output of the ROM 7 would be in the form of a five bit parallel 'word'; the number of bits is equal to the number of columns in the matrix representing a character. The ROM 7 stores 128 separate characters and is connected to a seven bit character select address circuit 8. The ROM 7 is also connected to a row select address circuit 9; in the case of generation of a 5×9 matrix a four bit row select address is required. Further details of the row select address system will be described later.

The output of the ROM 7 is applied to two "parallel-in serial-out" shift registers 10 and 11, directly to the register 10 and through a five bit parallel buffer store 20 to the register 11. The shift registers are also connected to a clock 12 which operates to shift the data in the registers. The outputs from the last two bits of both shift registers are connected to a logic module 13. The output of the last bit of shift register 10 is connected to a "D" type flip-flop 14 and the output of the logic module 13 is connected to a further "D" type flip-flop 15. The Q outputs of the flip-flops 14 and 15 are connected to a NAND-gate 17, the output of which is connected to an output terminal 18.

The output of the clock 12 is also applied to a divider 19 which produces two pulse outputs on every seventh clock pulse. The first of these pulse outputs is applied to the row select address circuit 9 and the buffer store 20, and the second pulse output is applied to the shift registers 10 and 11. When the second pulse output is produced the output of the ROM 7 from a particular row selected by the row select address circuit 9 is received by the shift register 10 and the contents of the buffer store 20 is received by the shift register 11. When the first pulse output is produced by divider 19, the output of the ROM 7 is received by the buffer store 20 and the row select address circuit 9 selects from the ROM 7 either the row immediately preceding the particular row or the row immediately following the particular row depending on whether the field being scanned is even or odd. It will be apparent that after the second pulse output from the divider 19 the shift registers 10 and 11 contain the data from two adjacent rows of the ROM 7. The row select address circuit 9 includes a counter which is incremented by unity after each television line so that the rows of the ROM 7 are addressed in turn.

The clock inputs of the flip-flops 14 and 15 are connected to the clock 12, that of the flip-flop 15 being connected through an inverter 16.

Figure 6:
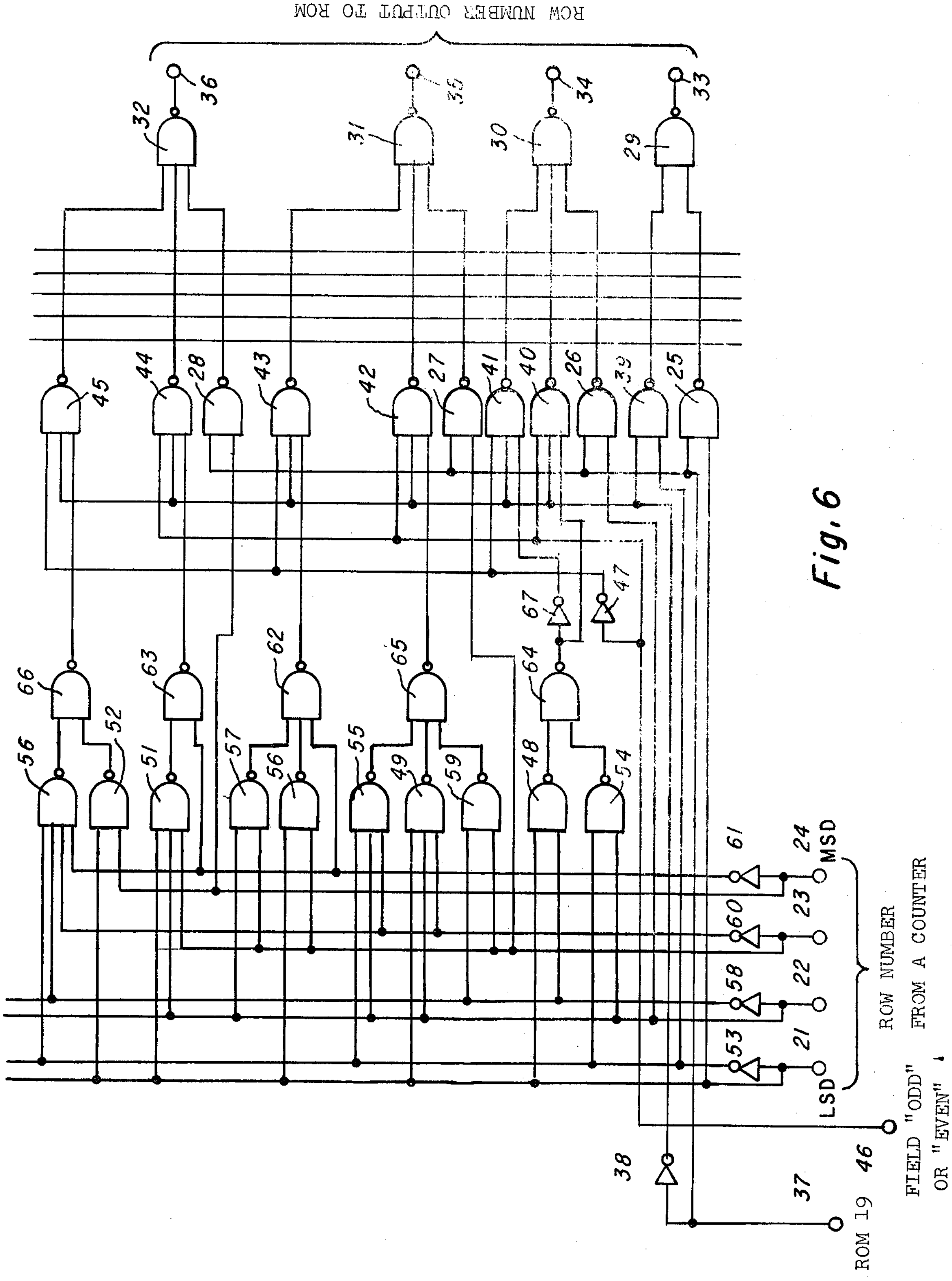
FIG. 6 is a circuit diagram of part of the arrangement shown in FIG. 5.

FIG. 6 shows the logic forming part of an example of the row select address circuit 9 of FIG. 5. The function of this circuit is to enable the transfer of the data representing the rows of the selected character in turn from the ROM 7 into the shift register 10 and the transfer of the data representing the immediately preceding or the immediately following rows, depending upon whether the field is even or odd, from the ROM 7 via the buffer store 20 into the shift register 11. The effect of the row address select circuit is therefore to arrange that pairs of adjacent rows such as are shown in FIGS. 3A and 3B appear in the shift registers 10 and 11.

In addition to the logic shown in FIG. 6 the row select address circuit 9 contains a counter in which the total is increased by unity after each television line from the divider 19. When the first pulse output of the divider 19 is not present, the logic level on 37 is high and the four bits representing the total in the counter, which are applied to terminals 21, 22, 23 and 24 of FIG. 6, are routed via gates 25, 26, 27 and 28 and output gates 29, 30, 31 and 32 to output terminals 33, 34, 35 and 36. Thus when the logic level at terminal 37 is high the total in the counter is applied to the ROM 7 as row address.

When the first pulse output is present and the logic level on terminal 37 is low, however, the total from the counter is to be incremented or decremented by unity depending on whether an odd or an even field is being scanned at the time. The logic level which is applied to a terminal 37 of FIG. 6 is connected to close the gates 25, 26, 27 and 28 when it is low, is inverted in inverter 38 and is effective to open or enable gates 39, 40, 41, 42, 43, 44 and 45. A signal indicating whether the field is odd or even is applied to a terminal 46 and is arranged to be high if the field is odd. The terminal 46 is connected directly to inputs of gates 40, 42 and 44 and through an inverter 47 to inputs of gates 41, 43 and 45. The output of the gate 39 is connected to an input of the gate 29. The outputs of the gates 40 and 41 are connected to inputs of the gate 30. The outputs of gates 42 and 43 are connected to inputs of the gate 31. The outputs of gates 44 and 45 are connected to inputs of the gate 32. Thus when the logic level at terminal 37 is low during an odd field the gates 30, 40, 42, and 44 are open, and during an even field the gates 30, 41, 43 and 45 are open.

The unit incrementing and decrementing of the total in the counter is achieved by some further gates as follows: The terminal 21 is connected directly to inputs of gates 48, 49, 50, 51 and 52 and through an inverter 53 to inputs of gates 54, 55 and 56. The terminal 22 is connected directly to inputs of gates 54, 49, 55, 57 and 51 and via an inverter 58 to inputs of gates 48, 59, and 56. The terminal 23 is connected directly to inputs of gates 59, 55, 50, 57 and 51 and via an inverter 60 to inputs of gates 49 and 56. The terminal 24 is connected directly to an input of gate 52 and via an inverter 61 to inputs of gates 62, 63 and 56. The outputs of gates 48 and 54 are applied to inputs of a gate 64. The outputs of gates 49, 55 and 59 are applied to inputs of a gate 65. The outputs of gates 50 and 57 are applied to inputs of the gate 62. The output of the gates 52 and 56 are applied to inputs of a gate 66. The outputs of the gates 62, 63, 64, 65 and 66 are applied to inputs of gates 43, 44, 40, 42 and 45 respectively. The output of the gate 64 is also inverted in an inverter 67 and applied to an input of the gate 41.

The components 48 to 67 are so connected that for: four digit binary numbers in the range 0 to 8 applied to the terminals 21 to 24 outputs representing that number incremented by one are applied to inputs of the gates 39, 40, 42 and 44 and outputs representing that number decremented by one are applied to the inputs of gates 39, 41, 43 and 45.

In operation the ROM 7 is addressed by the character select address circuit 8 to select the appropriate character (in this example 'K'). The ROM row select address circuit 9 addresses the ROM to select the appropriate row through its four bit output.

During the first pulse output from the divider 19 the data from a row of the ROM 7, immediately preceding or following a particular row depending on whether the field is even or odd, is received by the buffer store 20. During the corresponding second pulse output the data from the particular row of the ROM 7 is received by the shift register 10 and the data in the buffer store 20 is received by the shift register 11.

The ROM output is five bits in parallel and is read twice during each character interval in response to the first and second pulse outputs. The clock 12 is phase locked to the line synchronizing signal of the television signal and has a p.r.f. of 7 MHz. The shift registers 10 and 11 receive the five bit parallel outputs from the ROM 7 as described above in response to the second pulse outputs on every seventh clock pulse and shift on five of the remaining six clock pulses. The first pulse output of the divider 19 occupies the sixth clock pulse position. Thus one character interval which contains seven clock pulses occupies 1μS.

The outputs of the last two stages of the two shift registers 10 and 11 are logically combined in the logic module 13. If the last two bits of the shift registers 10 and 11 are D and E and $D_R$ and $E_R$ respectively, then a diagonal is present if $D.\bar{E}.\bar{D}_R.E_R$ or $\bar{D}.E.D_R.\bar{E}_R$ is true.

If a diagonal is present then the logic module 13 produces an output at the 'D' terminal of the "D" type flip-flop 15. The output from the last stage of the shift register 10 which forms the unmodified video output signal from the selected row of the ROM 7 is connected to the D terminal of the flip-flop 14. The clock pulse for the flip-flop 15 is in antiphase with the clock pulse for the flip-flop 14, the clock pulse being a square wave. Consequently any output from the logic module is passed through the flip-flop 15 for the 1/14 μs preceding the start of the output from the flip-flop 14 or the 1/14 μs after the end of the output from the flip-flop 14 and the outputs of the flip-flops 14 and 15 are combined in the gate 17 to produce at the output terminal the required modified video output signal.

One particular embodiment of the inventions has been described by way of example; there are however many other practical embodiments.

The matrix display could alternatively be a 5×7 matrix in which case only a three bit row select address is required. Many different indicia can be displayed in addition to conventional alphabetic and numeric data. Moreover, modifications could readily be made to the timing of operations within the circuit. Although the invention has been described with respect to the production of a character display using a horizontally scanned raster, it would equally well be possible to apply the invention to the production of the display using a vertically scanned raster.

What is claimed is:

1. Apparatus for generating video signals suitable to produce an alphanumeric display on a display panel by deflection of an energetic beam over the panel in an interlaced raster having first and second field scans, the apparatus including:

(a) digital storage means having a plurality of storage locations respectively allocated to different alphanumeric characters to be displayed, there being at each storage location a plurality of groups of storage elements storing data representing the particular character allocated to the location in a rectangular dot matrix form, each group of storage elements storing the dot pattern for a particular row of the matrix;

(b) first address means for selecting a storage location of the digital storage means in accordance with a character to be displayed;

(c) second address means for selecting at a series of instants in a particular order the groups of storage elements at the location selected by the first address means and producing corresponding first output data signals from the groups of storage elements, and also for selecting between the instants of the series the groups of storage elements in the same order to produce second output data signals from the groups of storage elements and such that a group selected between instants is associated with a group selected at the next preceding or the next succeeding instant depending on whether the data from the group selected is to be used in the said first or the said second field scan;

(d) first and second registers connected to receive the first and second output data signals respectively and store the corresponding data;

(e) means for sequentially selecting the data in both registers synchronously;

(f) logic means responsive to a pair of adjacent data elements in each of the first and second registers to detect a diagonal portion of said character to produce a control signal in response to said detection; and (g) means for modifying the data selected sequentially from the first register by the addition to it of (1) a leading edge dot elongation signal in response to a control signal produced by the logic means in response to a positive slope diagonal during a said first scan and in response to a negative slope diagonal during a said second scan and (2) a trailing edge dot elongation signal in response to a control signal produced by the logic means in response to a positive slope diagonal during a said second scan and in response to a negative slope diagonal during a said first scan, said modified data forming the video signal.

2. Apparatus according to claim 1 wherein the digital storage means is a read only memory.

3. Apparatus according to claim 1 wherein the first and second registers are shift registers and the means for sequentially selecting the data in the registers including means for applying shift pulses to the registers.

4. Apparatus according to claim 1, further including buffer storage means for temporarily storing one of the first and the second output data signals of the digital storage means and means for transferring data from the buffer storage means to one of the first and second registers simultaneously with the transfer of data from the digital storage means to the other one of the first and second registers.

5. Apparatus according to claim 1, wherein the logic means responds to one pair of adjacent data elements storing a "1" and a "0" and the other pair of adjacent data elements storing a "0" and a "1" to produce the said control signal.

6. Apparatus according to claim 1, wherein the modifying means includes a first flip-flop which is set by the data selected sequentially from the first register and is reset by a clock pulse, a second flip-flop which is set by said control signal from the logic means and reset by an inverted clock pulse, and a NAND gate having inputs connected to the outputs of the first and second flip-flops, the modified data forming the video signal being provided by the output of the NAND gate.

7. Apparatus according to claim 1, wherein the dot matrix for each character is 5 dots wide by 7 dots high.

8. In apparatus for producing a display in response to a line interlaced video signal having first and second alternating fields, circuit means for generating a said video signal for producing an alphanumeric character display in the form of a dot matrix character, each matrix location comprising segments of two next adjacent lines in said display, said circuit means comprising, in combination:

(a) digital storage means having a plurality of storage locations respectively allocated to an alphanumeric character, each storage location comprising a plurality of groups of storage elements storing data representing a row of the particular dot matrix format of the character allocated to that storage location;
(b) first address means for selecting a storage location of said digital storage means for a desired character;
(c) first and second parallel-in-serial-out shift registers;
(d) means for synchronously clocking said shift registers;
(e) means for loading data successively from each group of storage elements selected by said first address means into said first shift register during each of said first and second field scans;
(f) second address means for loading data successively from each group of storage elements next preceding the group selected by said first address means into said second shift register during said first line scans and for loading data successively from each group of storage elements next succeeding the group selected by said first address means into said second shift register during said second line scans;
(g) logic means responsive to non-correspondence of data content in a first pair of corresponding stages of said first and second shift registers and in a second pair of corresponding stages of said first and second shift registers adjacent to said first pair as data is clocked through said first and second shift registers to generate dot modification signals;
(h) means for extracting serial data from said second shift register; and modification means responsive to said dot modification signals to insert dot elongation signals in the serial data extracted from said second shift register
    1. At locations next preceding data from said second shift register in response to dot modification signals generated by said logic means on the basis of data content of said first and second pairs of corresponding stages representing a positive slope diagonal portion of said alphanumeric character during a first line scan and representing a negative slope diagonal portion of said alphanumeric character during a second line scan, and
    2. At locations next succeeding data from said second shift register in response to dot modification signals generated by said logic means on the basis of data content of said first and second pairs of corresponding stages representing a positive slope diagonal portion of said alphanumeric character during a said second line scan and representing a negative slope diagonal portion of said alphanumeric character during a said first line scan.

9. Apparatus according to claim 8, including buffer storage means connected between said data storage means and said first shift register.

10. Apparatus according to claim 8, wherein said data extraction means comprises a first D-type flip-flop having a set input connected to receive serial data from said second shift register, and said modification means includes a second D-type flip-flop having a set input connected to receive said dot modification signals, and a NAND gate connected to receive outputs from said first and second T-type flip-flop, and wherein said clocking means is connected directly to said first flip-flop and by inverter means to said second flip-flop.

* * * * *